May 29, 1945.   G. T. CHAPMAN   2,376,958
FISHING FLOAT
Filed March 27, 1943   2 Sheets-Sheet 1

INVENTOR.
George T. Chapman
BY Barnes, Kisselle, Laughlin & Raisch
Attorneys.

May 29, 1945.   G. T. CHAPMAN   2,376,958
FISHING FLOAT
Filed March 27, 1943   2 Sheets-Sheet 2
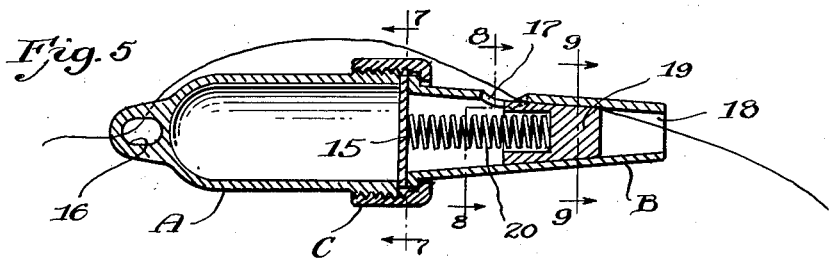
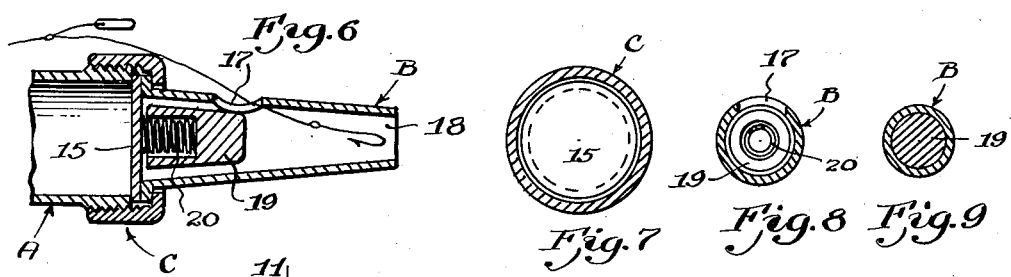
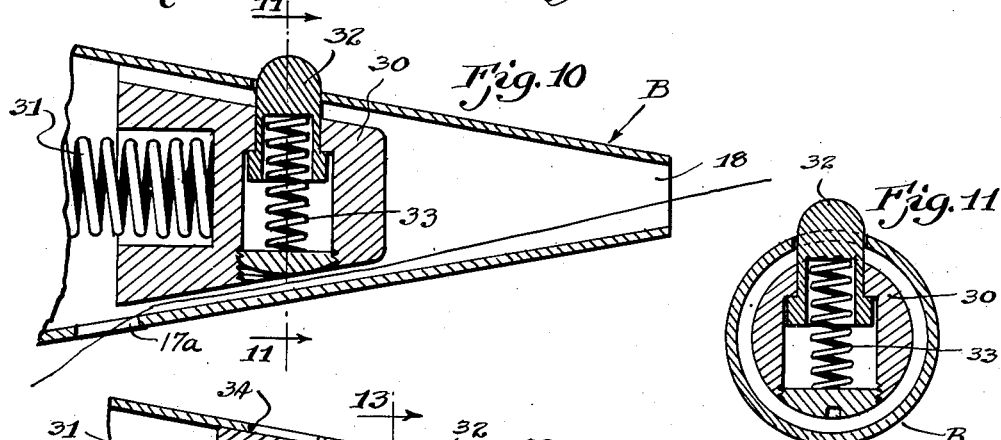
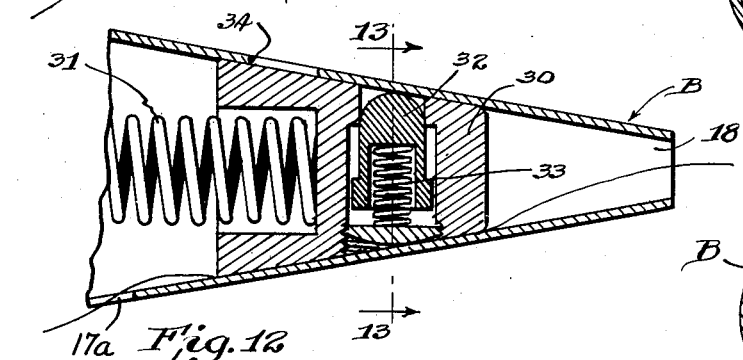
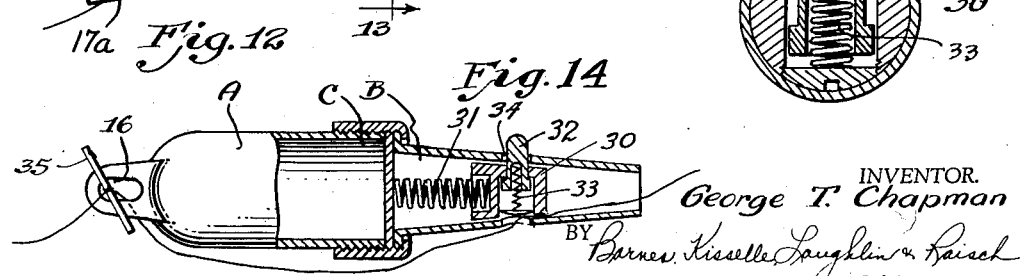
INVENTOR.
George T. Chapman
BY Barnes, Kisselle, Laughlin & Raisch
Attorneys.

Patented May 29, 1945

2,376,958

UNITED STATES PATENT OFFICE 2,376,958

FISHING FLOAT

George T. Chapman, Grosse Pointe, Mich.

Application March 27, 1943, Serial No. 480,758

10 Claims. (Cl. 43—49)

This invention relates to a fishing float and has particularly to do with that type of float which is known as a casting float.

It is an object of the present invention to provide a fishing float which may be used as a casting float, which is self-adjusting, and which may be also adjusted on the line at certain depths and yet which will permit the reeling in of the line when necessary.

It is a further object to provide a float which may be applied to a line already furnished with a leader and sinker. Another object is to provide a float with the above features which has adjustable buoyancy.

Other objects and features of the invention having to do with details of construction and operation will be brought out in the following description and claims.

In the drawings:

Figures 1, 2 and 3 illustrate the float in use showing the manner in which it is movable on the line when the line is reeled in.

Figure 5 is a longitudinal sectional view.

Figure 6 is a partial section showing the locking plunger retracted.

Figures 7, 8 and 9 are transverse sectional views on line 7—7, 8—8 and 9—9 of Figure 5.

Figures 10, 11, 12 and 13 are longitudinal and cross-sectional views of a modified form of the invention showing a plunger in a retracted and locking position.

Figure 14 shows the float when used with a line stop.

Figure 1:
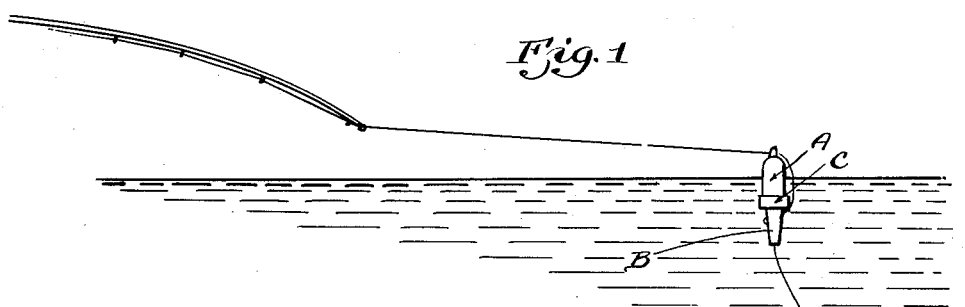
Figure 2:
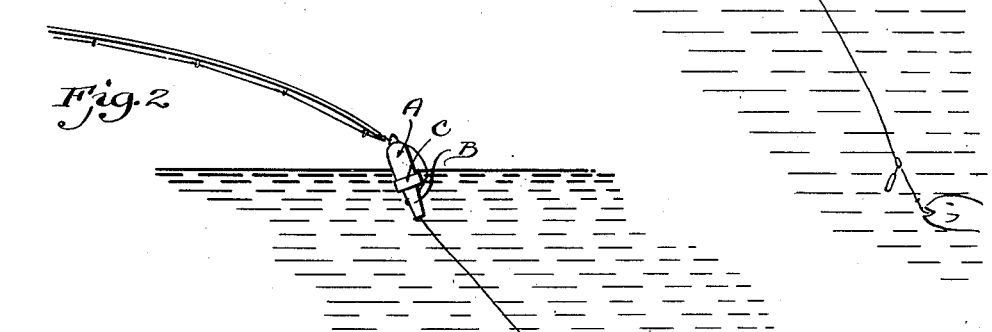
Figure 3:
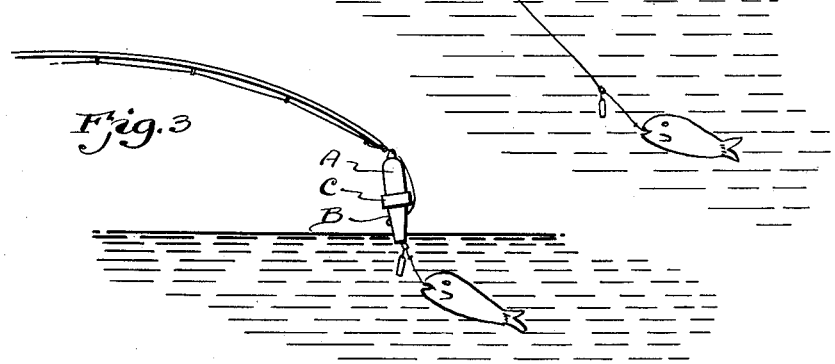
Figure 4:
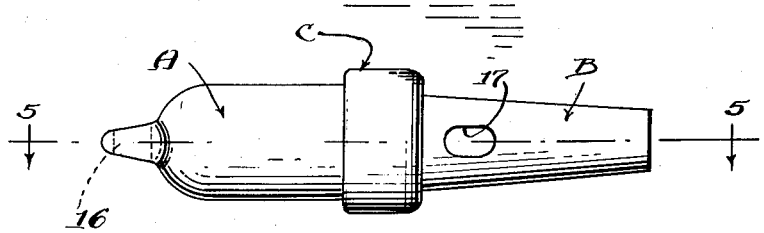
Figure 4 is an elevation of the float.

Referring to Figures 4 and 5 the float consists of main bodies A and B connected by a portion C. The main body A forms a buoyancy chamber in connection with a disc 15. The portion A has also an elongated eye 16 formed in the top end thereof. The buoyancy of the portion A may be regulated by admitting varying quantities of water into the chamber thereof. This is accomplished by simply loosening the collar or connecting ring C.

The portion B is a tapered hollow shell having an elongated opening 17 in the side thereof and an opening 18 in the end. Within the portion B is a plunger 19. This plunger is tapered so that its movement outward is limited. It is backed by a spring 20. The plunger, however, may be retracted as shown in Figure 6 to permit a leader and sinker, to be passed therethrough as well as through the opening 16. The entire float may then be readily adjusted on the line since it will slip downward on the line, or if it is to be moved up the plunger 19 may be retracted by inserting a knife blade or something to move it against the spring 20. If a strike is had the line may be completely reeled in since, when the float strikes the end of the pole the line will then slip through the float until the catch is brought up to the end of the pole. With this device it will be seen that a fisherman may change from casting to float fishing without the necessity of changing his leader or removing it in order to fasten on the float, and yet the float is firmly secured to the line when threaded through it and is readily adjustable without knotting.

In Figures 10 and 14 is shown a modification of the device which may be readily used for casting. The plunger 30 backed by spring 31 is itself equipped with a small transverse plunger 32 backed by a spring 33. A hole 34 is placed in the member B at a point where it will lock the plunger in place. The float may then be used as a sliding float by catching in the line a stop 35. The float may be slid to the casting bait during a cast and will then move up to the stop 35 when the bait hits the water; the remainder of the float construction is identical with that previously described. The line hole 17a corresponds with hole 17 of Fig. 4.

I claim:

1. A float for use in fishing which comprises a substantially cylindrical buoyant body portion having means forming a line aperture thereon, a tapered hollow body portion provided with a sidewall line port, a connecting means to hold said body portions together in axial alignment, a plunger within said tapered portion, and means normally urging said plunger against the inner sidewalls of said tapered body portion at a point below the sidewall line port whereby a line passing through said port will be frictionally held between said plunger and tapered body portion.

2. A float for use in fishing which comprises a substantially cylindrical body portion provided with a closed end and an open end, apertured means on said closed end for receiving a line, a tapered body portion open at each end and provided with a line port located between the ends, a disc for closing the open end of said cylindrical portion, and connecting means for locking said body portions in axial alignment and holding said disc in sealing engagement with said cylindrical body portion.

3. A float for use in fishing which comprises a substantially cylindrical body portion provided with a closed end and an open end, apertured means on said closed end for receiving a line, a tapered hollow body portion provided with a line port located between the ends, a disc for closing the open end of said cylindrical portion, and connecting means for locking said body portions in axial alignment and holding said disc in sealing engagement with said cylindrical body portion, a plunger within said tapered portion adapted in one position to contact the walls thereof at a point below said line port, and means for resiliently urging said plunger in a direction to contact said walls but permitting retraction of the plunger for the passage of line and leader and the like.

4. A float for use in fishing which comprises a substantialy cylindrical body portion provided with a closed apertured end and an open end, a tapered hollow body portion provided with a sidewall line port, a connecting means to hold said body portions together in axial alignment and serving also to seal said cylindrical body portion, a tapered plunger within said tapered portion, and means normally urging said plunger against the inner sidewalls of said tapered body portion at a point below the line port whereby a line passing through said port will be frictionally held between said plunger and tapered body portion, and means on said plunger to lock it in a retracted position to permit free flow of line through said tapered portion.

5. A float for use in fishing which comprises a substantially cylindrical body portion provided with a closed end and an open end, apertured means adjacent said cylindrical body portion for receiving a line, a tapered hollow body portion provided with a line port located between the ends, a disc for closing the open end of said cylindrical portion, and connecting means for locking said body portions in axial alignment and holding said disc in sealing engagement with said cylindrical body portion, a plunger within said tapered portion, and means on said plunger to lock it in a retracted position to permit free flow of line through said tapered portion.

6. A float for use in fishing which comprises a substantially cylindrical body portion provided with a closed end and an open end, apertured means adjacent said cylindrical body portion for receiving a line, a tapered hollow body portion provided with a line port located between the ends, a disc for closing the open end of said cylindrical portion, and connecting means for locking said body portions in axial alignment and holding said disc in sealing engagement with said cylindrical body portion, said connecting means being releasable to permit opening of said cylindrical body portion to allow buoyancy adjustment.

7. A casting float for a fish line comprising a casing having a portion whose specific gravity renders it buoyant and portions adjacent thereto provided with line openings, means normally obstructing one of said openings but shiftable to expose it enough to permit the passage of hook attaching means and the like, said means in its normal position holding a line in frictional engagement but permitting one way movement against such friction, and additional means cooperating with said casing to lock said shiftable means in retracted position to permit free flow of line.

8. A float for use in fishing which comprises a buoyant substantially cylindrical body portion, a second hollow body portion joined to said main portion and provided with a line port located between the ends, line controlling means in said second body portion, and means joining said body portions releasable to permit buoyancy adjustment of the float.

9. A casting float for a fish line comprising a casing having a portion whose specific gravity renders it buoyant, means extending from one end hellow in cross-section and having an opening to the atmosphere at one end thereof and provided with a side wall line port, means normally obstructing passage through said extending means but shiftable to expose the line port enough to permit the passage of hook attaching means therethrough, said means in its normal position holding a line by frictional engagement but permitting one way movement against such friction and with the line extending through the opening and port.

10. A float for use in fishing which comprises a buoyant body portion, an elongated portion extending from said body having an opening reduced in cross-section in a direction away from the body and provided with a sidewall line port, a plunger in said elongated portion, and resilient means urging said plunger in a direction to contact the inner walls of the elongated portion at a point below the line port but permitting retraction of the plunger for the passage of line and leader and the like.

GEORGE T. CHAPMAN.